Patented Nov. 5, 1940

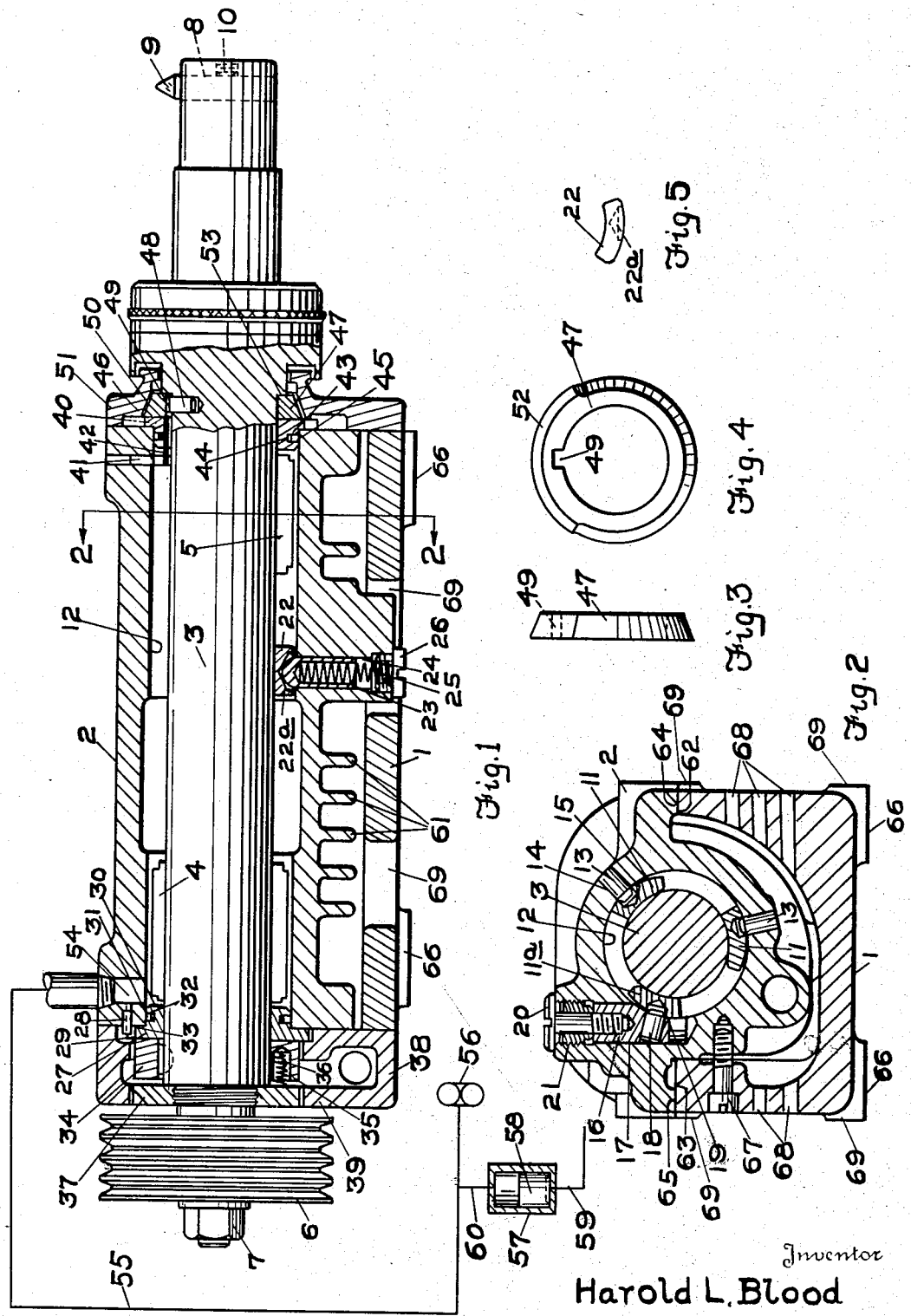

2,220,779

UNITED STATES PATENT OFFICE 2,220,779

OFFSETTING ARRANGEMENT FOR BORING TOOLS AND THE LIKE

Harold L. Blood, Worcester, Mass., assignor to The Heald Machine Company, Worcester, Mass., a corporation of Massachusetts Application September 15, 1937, Serial No. 163,983

10 Claims. (Cl. 77—3)

The present invention relates to an arrangement by which a rotary spindle, such as used in boring, grinding and like operations, may be offset slightly at the conclusion of such operation, so that upon withdrawal of the tool from the workpiece bore the tool will be radially spaced from the workpiece surface and will leave no mark thereon.

In many boring machines, the axis of the boring bar, or spindle, is normally in fixed radial relation to the axis of the workpiece; thus when the boring bar or spindle with its tool is withdrawn axially from the workpiece bore, the cutting point of the tool leaves a spiral score or groove in the finished workpiece surface if the spindle is rotating, or a straight groove parallel to the axis of the workpiece, if the spindle is stopped before the axial withdrawal movement. Although this spiral or straight score is extremely small in cross-section and does not ordinarily affect the utility of the workpiece, it does, in certain instances, affect the salability of the workpiece by reason of the appearance thereof.

Various arrangements have been developed for avoiding such scoring of the workpiece surface during the withdrawal of the boring tool, one example being disclosed in the Schmidt Patent No. 2,058,359, in which the tool in the end of the rotating boring spindle is retracted radially relative to the axis of rotation of the spindle by the stopping of the spindle. The present invention provides another arrangement by which the boring tool may be shifted radially relative to its axis of rotation, with this shifting movement occurring automatically at the completion of the boring operation.

In certain types of boring or turning machines, the workpiece is mounted for rotation and the cutting tool is held in fixed position, as in the turning of the outer surfaces of workpieces, or in the boring of relatively large diameter workpieces. To obtain a relative lateral movement between the workpiece and the cutting tool to avoid the spiral or straight groove above referred to, the structure of the present invention may be applied to the rotating spindle which provides for supporting and rotating the workpiece, instead of to the tool spindle to which the invention is applied when the tool is rotated and the workpiece is held stationary. It will be understood that this same arrangement is equally effective in internal grinding machines for procuring a back-off of the wheel relative to the workpiece, this back-off resulting from the incorporation of structure embodying the present invention in either the wheelhead or the workhead.

Rocking shoe bearings for supporting rotating spindles, as shown, for example, in the Haas Patent No. 2,072,814, are adjusted to provide a space between the spindle surface and the rocking shoe bearing, and thus, when the spindle is not rotating, it is possible to move the spindle slightly in a direction at right angles to its axis of rotation. The present invention takes advantage of this available lateral displacement characteristic of spindles supported by rocking shoe bearings by providing a lateral shifting movement of the spindle which results in a withdrawal of the tool from operative position relative to the workpiece surface.

One arrangement for procuring a lateral shifting movement of the spindle within the housing is shown in the copending Blood application Serial No. 135,968, filed April 9, 1937, and provides for shifting the spindle laterally of the housing by a spring, which becomes operative to move the spindle laterally whenever the latter is brought to rest. Another arrangement of the same general character is shown in the Heald application Serial No. 142,673, filed May 14, 1937, and involves the use of a centrifugally controlled lever for shifting the spindle laterally when the spindle is brought to rest and a lateral shifting movement is possible. The arrangement of the present application is such that the lateral or radial movement of the spindle relative to its housing is procured by fluid pressure actuated means, thereby assuring a definite lateral movement at the desired point in the operation of the machine and independently of the rotation of the spindle.

According to the present invention, the working spindle, whether it be used for supporting a boring tool, a grinding wheel or a workpiece, is mounted for rotation on lubricated bearings, so arranged that when the spindle is at rest, a slight play in the spindle is available, and mechanism incorporated in the spindle housing takes advantage of this slight play in producing a lateral movement of the spindle within the housing to offset the tool from the workpiece surface.

Other and further objects and advantages of the invention will more fully appear from the following detailed description, taken in connection with the accompanying drawing, in which—

Fig. 1 is a sectional view through a tool head embodying the invention.

Fig. 2 is a sectional view along line 2—2 of Fig. 1.

Fig. 3 is a side view of one of the elements of the tool head.

Fig. 4 is an end elevation of the element of Fig. 3.

Fig. 5 is an elevation of one of the bearing elements.

Like reference characters refer to like parts in the different figures.

The boring head shown, in the drawings as one embodiment of the present invention, is intended for use on any of the familiar types of boring or cutting machines which incorporate a rotary spindle for supporting either the cutting tool or the workpiece. One example of a boring machine to which the head shown is particularly applicable is disclosed in the Schmidt Patent No. 2,058,359. In machines of this character the base has a reciprocable table thereon on which either the workpiece to be bored, or the boring head, is mounted, the other of these elements being positioned on a bridge secured to the base of the machine at one end of the table.

Movement of the table procures a relative axial movement between the workpiece and the boring tool for a boring operation on the workpiece while the table is moving in one direction, and a withdrawal of the tool from within the workpiece bore when the table is moving in the opposite direction. Prior to reversal of the table movement, and after the boring tool has completed its action on the workpiece, the rotating boring spindle may be stopped; in any event, the mechanism shown in the drawing is rendered operative to procure a relative offsetting movement between the tool and the workpiece. The mechanism for stopping the spindle rotation is fully disclosed in the Schmidt patent above referred to and as it is not a feature of the present invention, will not be described in detail.

As shown in Figs 1 and 2, the boring head embodying the invention has a support 1 on which is mounted the housing 2 in which the spindle 3 is journalled. The spindle is preferably journalled in suitable axially spaced rocking shoe bearings 4 and 5, hereinafter described in detail. The spindle has a pulley 6 at one end thereof suitably secured against rotation on the spindle, as by a clamping nut 7, and, when the boring head is in use, a driving connection is provided between the pulley 6 and a driving motor, not shown, by suitable V-belts. The other end of the spindle has an extension which provides a radially extending bore 8 in which is positioned a boring tool 9, the latter being held in position by a clamping screw 10.

As shown in Fig. 2, each set of bearings 4 and 5 for the spindle comprises a plurality of rocking shoes 11 and 11a having their inner surfaces curved on a slightly greater radius of curvature than the radius of curvature of the periphery of the spindle 3. The outer surface of each shoe has a slightly smaller radius of curvature than the radius of curvature of the bore 12 in which the shoes are positioned. Each of the shoes 11 is held in position by a locating pin 13 which is received in a bore 14 in the housing 2, with the inner end of the pin engaging in a recess 15 in the outer surface of the shoe. The diameter of the recess 15 is slightly greater than the diameter of the pin 13, the latter being preferably tapered or rounded at its inner end, as shown, so that the outer surface of the shoe may rest against the bore 12 and rock thereon, being held in position by the pin. Since the curvature of the shoes 11 is greater than that of the bore 12, the shoes have a line contact with the surface of the bore and thus may rock slightly in operation.

The other shoe 11a is adjustable within the housing by means of a plunger 16 located in a bore 17 in the housing. A pin 18 corresponding to the pins 13 engages in a recess 19 in the rocking shoe 11a, and this pin is carried by the plunger 16. A portion of the plunger 16 has an arcuate surface to correspond approximately to the surface of the bore 12. A screw 20 extends through a threaded plug 21 in the bore 17 and holds the plunger 16 against the inner end of the plug 21, thereby definitely locating the rocking shoe 11a relative to the housing 2.

The weight of the spindle is compensated for by a shoe 22 similar to the shoes 11. As shown in Fig. 5, this shoe has a recess 22a in the outer side thereof for engagement with a plunger 23 vertically slidable in a bore 24 in the housing 2. A coil spring 25 positioned between the plunger and a cap 26 urges the plunger upwardly to hold the shoe 22 against the underside of the spindle. The spring is selected to exert an upward pressure on the spindle substantially equal in amount to the weight of the spindle.

The spindle 3 has a collar 27 at the end adjacent the pulley 7 and this collar is turnable and axially slidable on the spindle, being held against rotation relative to the housing 2 by a pin 28 in the housing engaging in a notch 29 in the collar. A cylindrical outer surface 30 of the collar has a groove 31 in which a piston ring 32 is positioned and the latter provides a close fit between collar 27 and bore 12. The collar 27 has a projecting flange 33 engaging with the end of the housing 2. A ring 34 is keyed to the spindle 3 on the outer side of the collar 27, between the collar and the pulley 7, and is held against the collar by coil springs 35 positioned in recesses 36 in the ring. These springs engage with a disk 37 threaded on the end of the spindle 3 adjacent to the pulley. The collar 27 and ring 34 are preferably both positioned within a cap 38 secured to the end of the housing 2 and the support 1, the disk 37 being substantially flush with an inwardly extending flange 39 on the cap to prevent excessive loss of oil from within the cap.

At the opposite end of the spindle 3 is positioned a collar 40 similar to the collar 27 and held against rotation within the housing by a pin 41 positioned in the housing and adapted to be engaged by a pin 42 projecting inwardly from the collar 40. The latter has a cylindrical surface 43 in which is formed a groove 44 receiving a piston ring 45 so as to provide a close fit between the collar 40 and the bore 12. The collar 40 has a projecting flange 46 which engages the end of the housing 2 to limit the axial movement of the collar.

Engaging with the outer side of the collar 40 is a ring 47 held against turning movement relative to the spindle by a pin 48 positioned in the spindle and engaging a keyway 49, Fig. 4, in the ring. The outer surface of the ring 47 is tapered, as shown in Figs. 1 and 4, to correspond with a similar taper 50 in a cap 51 secured to the end of the housing 2 and the support 1. The greater portion of the peripheral taper on the ring 47 is cut away, as shown in Figs. 3 and 4, to leave a projecting tapered portion 52 which is located, when the ring 47 is mounted on the spindle, on the same side of the spindle as the point of the boring tool. By this arrangement it will be apparent that when the cooperating tapered surfaces 52 and 50 are urged into engagement with each other, the spindle 3 is urged radially in a direction to move the cutting point of the boring tool radially inward toward the normal center of rotation of the spindle. This radial movement is possible by reason of the rocking shoe bearing structure above described, which, as is well known, permits a lateral shifting movement of the spindle when the latter is not rotating at full speed, or is at rest.

To obtain this radial back-off of the tool, which is effected by urging the cooperating tapered surfaces 50, 52 into engagement, the bore 12 in the housing 2 is filled with fluid under pressure at that point in the boring operation when it is desired to have the radial back-off take place. When this occurs, the pressure of the fluid urges the collars 27 and 40 apart, these collars acting as pistons and the movement of the collar 40 moves the ring 47 to the right, Fig. 1, into engagement with the tapered surface in the cap 51. This axial movement of the ring 47 and collar 40 is possible by reason of the springs 35 which allow a slight axial movement of the spindle 3 within the housing. It will be apparent that the ring 47 engages a shoulder 53 on the spindle so that, when the fluid pressure within the bore in the housing 2 is reduced, the springs 35 will return the spindle to the normal position shown with the tapered portion 52 of the ring 47 slightly separated from the taper 50.

Boring heads of this character are generally mounted on boring machines which provide for automatically stopping the rotation of the boring spindle at the completion of the boring operation and prior to the withdrawal of the boring tool from the workpiece bore. Mechanism for controlling the spindle rotation is well known and is fully described in the Schmidt Patent No. 2,058,359, and as this mechanism is not a feature of the present invention it need not be described in detail. The mechanism for stopping the spindle may also be utilized to procure the lateral or radial back-off of the boring tool from operative position. To this end the housing 2 has a port 54 connected by a conduit 55 to a source of lubricating oil 56, the latter being represented by a pump which maintains a predetermined pressure in the bore 12 at all time. A casing 57 having a plunger 58 therein is connected at one end to a conduit 59 from the brake cylinder which provides for stopping the spindle rotation. The other end is connected by a conduit 60 to the conduit 55. Thus, when fluid under pressure is directed to the brake mechanism for stopping the spindle rotation, the plunger 58 is moved upwardly, thereby temporarily increasing the pressure of the fluid in the housing 12 to urge the collars 27 and 40 apart, thereby providing the radial back-off in the manner described.

As fully explained in the copending application of Blood, Serial No. 135,968, above referred to, the rocking shoe bearings 4 and 5 support the spindle in such a manner that when the spindle is rotated the spindle will have a substantially fixed axis of rotation and there will be no lateral spindle play by reason of the wedge-shaped film of oil built up between each of the rocking shoe bearings and the spindle during the spindle rotation. This function of rocking shoe bearings is well known and as the normal operation of rocking shoe bearings is also understood and fully described as well in the Blood application referred to, it need not be described here in detail.

It is also characteristic of rocking shoe bearings that, when the spindle is at rest, lubricating oil is no longer wiped in between the shoes and the spindle, and the large initial clearance between the periphery of the spindle and the rocking shoes may be again established. A radial shifting movement of the spindle relative to the housing is then possible and it is this available shifting movement which is utilized in connection with the structure above described in providing the lateral separation of the cutting tool from the workpiece bore during the withdrawal of the tool from the workpiece.

The normal operation of the device will be apparent from the foregoing description. It will be understood that the same mechanism which provides for the lateral shifting movement, that is to say, the cooperating tapered ring 47, and conical surface 50, may provide a means for stopping the spindle rotation by reason of the friction set up between the cooperating tapered surfaces when they are urged into engagement with each other by reason of the increased fluid pressure in the bore 12.

In order to maintain the spindle and housing at a relatively low temperature during the rotation of the spindle, thereby avoiding excessive overheating, resulting from friction in the head, the housing 2 has a plurality of integral fins 61 to provide for more rapid dissipation of heat in the housing. It will be noted that the support has flat machined surfaces 62 and 63 which cooperate with corresponding flat surfaces 64 and 65 on the housing 2 to provide for a positioning of the housing so that the normal axis of rotation of the spindle shall be exactly parallel to the underside of the bosses 66 on which the support 1 rests when mounted on a boring machine. Suitable bolts 67 may hold the support 1 and housing 2 in proper relation to each other. For more effective cooling, the support 1 may have a plurality of elongated slots 68 to provide for a passage of air from outside of the support 1 into the inside thereof where the cooling fins 61 are located. It will be noted that the boss 66 holds the underside of the support away from the structure upon which the head rests, thereby providing for a further circulation of air through openings 69 in the underside of the support.

The provision of a separate support 1 to which the housing 2 is positively secured makes possible the construction of a housing having a much thinner wall between the bore thereof and the exterior surface, which materially aids in cooling the housing. The support 1 provides rigidity for the housing and provides, as will be apparent, an air passage between the U-shaped support, Fig. 2, and the housing 2, resting thereon. It will be apparent that for efficient cooling, the wall thickness of the housing 2 should be as small as possible consistent with rigidity, as it is essential that the boring spindle rotate without any vibration; such rigidity is obtained with a minimum wall thickness in the housing by the provision of the cooperating support 1.

The separate support 1 for the housing also makes the position of the spindle axis entirely independent of the expansion and contraction of the housing by reason of the heating and cooling thereof. To this end the machined surfaces 64 and 65 are substantially in a horizontal plane passing through the spindle axis and the support 1 is formed of a metal having a low coefficient of thermal expansion. Thus the expansion of the housing 2 by heating thereof does not affect the vertical position of the boring spindle relative to the supporting structure to which the boring head is secured.

Boring heads of this character are frequently mounted side by side on a machine for simultaneous boring operations on a plurality of surfaces at one time. The support 1 has pads 69 on the sides thereof to aid in locating each head in relation to adjoining heads. The lateral edges of the housing 2 are slightly less widely spaced than the surfaces of the pads 69 and any expansion of the housing will thus not result in engagement between adjacent housings even though adjoining heads may have the pads 69 in contact. Thus the lateral spacing of separate heads is not affected by any expansion or contraction thereof.

Since the support 1 and housing 2 are separate elements, the support 1 may be made of a suitable low-expansion material and the housing 2 of a lower cost material which is more readily machined. The cost of the entire head is thus less than would be the case if the housing and support were a single piece and were both made of the low-expansion material. The two piece construction thus provides the advantage above outlined without the cost of making the entire supporting structure of low-expansion material.

To assure the proper functioning of the tool head independently of temperature changes, the housing 2 is preferably made of a material having a coefficient of thermal expansion substantially equal to the coefficient of thermal expansion of the spindle. Thus, as the housing and spindle become heated during operation, the clearance between the surfaces of the rocking shoe bearings and the cylindrical surface of the spindle cooperating therewith remains constant independent of the changes in temperature of the several elements. Since all of the rocking shoe bearings are not necessarily uniformly spaced from the spindle when the latter is at rest, the clearance above referred to is the clearance between the bearing surfaces and the spindle surface while the latter is rotating. In cases where extreme accuracy is required it may be desirable to take into consideration the coefficient of thermal expansion of the rocking shoe bearings in addition to the expansion of the housing and spindle, so that the operative clearance between the bearing surfaces and the cooperating spindle surface may be maintained exactly constant throughout any temperature changes occurring in the tool head.

I claim:

1. In a device of the class described, a housing, a spindle journalled in said housing, bearings for said spindle mounted in the housing, said bearings providing for a slight lateral movement of the spindle relative to the housing when the spindle is not rotating, cooperating means on the spindle and housing operative upon axial movement of the spindle relative to the housing for shifting said spindle laterally of the housing, and means within the housing for shifting said spindle axially of the housing.

2. In a device of the class described, a housing, a spindle journalled in said housing, bearings for said spindle mounted in the housing, said bearings providing for a slight lateral movement of the spindle within the housing when the spindle is not rotating, cooperating tapered surfaces on the spindle and housing operative upon axial movement of the spindle for shifting the spindle laterally of the housing, and fluid pressure actuated means within the housing for shifting said spindle axially of the housing.

3. In a boring head, a housing, a spindle journalled in said housing, said spindle having a boring tool on the projecting end thereof, rocking shoe bearings for the spindle, said bearings providing for a slight lateral movement of the spindle within the housing when the spindle is not rotating, and fluid pressure actuated means within the housing for shifting the spindle laterally within the housing in a direction opposite to the projection of the tool from the spindle.

4. In a device of the class described, a housing, a spindle journalled in the housing, bearings for the spindle mounted in the housing and providing for a lateral movement of the spindle relative to the housing only when the spindle is at rest, and fluid pressure actuated means within the housing for procuring a lateral shifting movement of the spindle within the housing.

5. In a boring head, a housing, a spindle journalled in the housing, and having an end projecting beyond the housing, said spindle having a boring tool on the projecting end thereof, bearings for the spindle mounted in the housing and providing for a lateral movement of the spindle relative to the housing only when the spindle is at rest, and fluid pressure actuated means within the housing for shifting the spindle laterally of the housing in a direction opposite to the projection of the tool from the spindle.

6. In a boring head, a housing, a spindle journalled in the housing, and having an end projecting beyond the housing, said spindle having a boring tool on the projecting end thereof, bearings for the spindle mounted in the housing and providing for a lateral movement of the spindle relative to the housing only when the spindle is at rest, fluid pressure actuated means within the housing for shifting the spindle laterally of the housing in a direction opposite to the projection of the tool from the spindle, and means for exerting a lateral upward pressure on the spindle to counterbalance the weight thereof.

7. In a device of the class described, a housing, a spindle journalled in said housing, bearings for the spindle mounted in the housing, said bearings providing for a slight lateral shifting movement of the spindle within the housing only when the spindle is at rest, cooperating means on the spindle and housing and operative by axial movement of the spindle for applying a lateral pressure to the spindle in a predetermined direction, and fluid pressure actuated means within the housing for shifting the spindle axially of the housing.

8. In a device of the class described, a housing, a spindle journalled in said housing, bearings for the spindle mounted in the housing, said bearings providing for a slight lateral movement of the spindle within the housing only when the spindle is at rest, cooperating means on the spindle and housing and operative by axial movement of the spindle for applying a lateral pressure to the spindle in a predetermined direction, and fluid pressure actuated means within the housing for shifting the spindle axially of the housing, said fluid pressure actuated means including a cylinder and piston, one of which is connected to the spindle.

9. In a boring head, a housing, a spindle journalled in the housing, and having an end projecting beyond the housing, said spindle having a boring tool on the projecting end thereof, rocking shoe bearings for the spindle to provide for a lateral movement of the spindle within the housing when the spindle is at rest, cooperating means on the spindle and housing and operative by axial movement of the spindle for applying a lateral pressure to the spindle in a direction opposite to the projection of the tool from the spindle, said cooperating means being a cone and cooperating member engageable therewith, one of which is mounted on the spindle, and fluid pressure actuated means for procuring a relative movement between said cone and cooperating member.

10. In a device of the class described, a housing, a spindle journalled in the housing, cooperating means on the spindle and housing, for offsetting said spindle from its normal operating position, said means being a cone secured against rotation on the spindle, and a cooperating tapered surface in the housing, and fluid pressure means for urging said cone and said surface into engagement.

HAROLD L. BLOOD.